May 19, 1970   R. T. DIXON   3,512,507
METHOD AND APPARATUS TO CONTROL WATER SOLIDS IN BOILERS
Filed Sept. 6, 1968
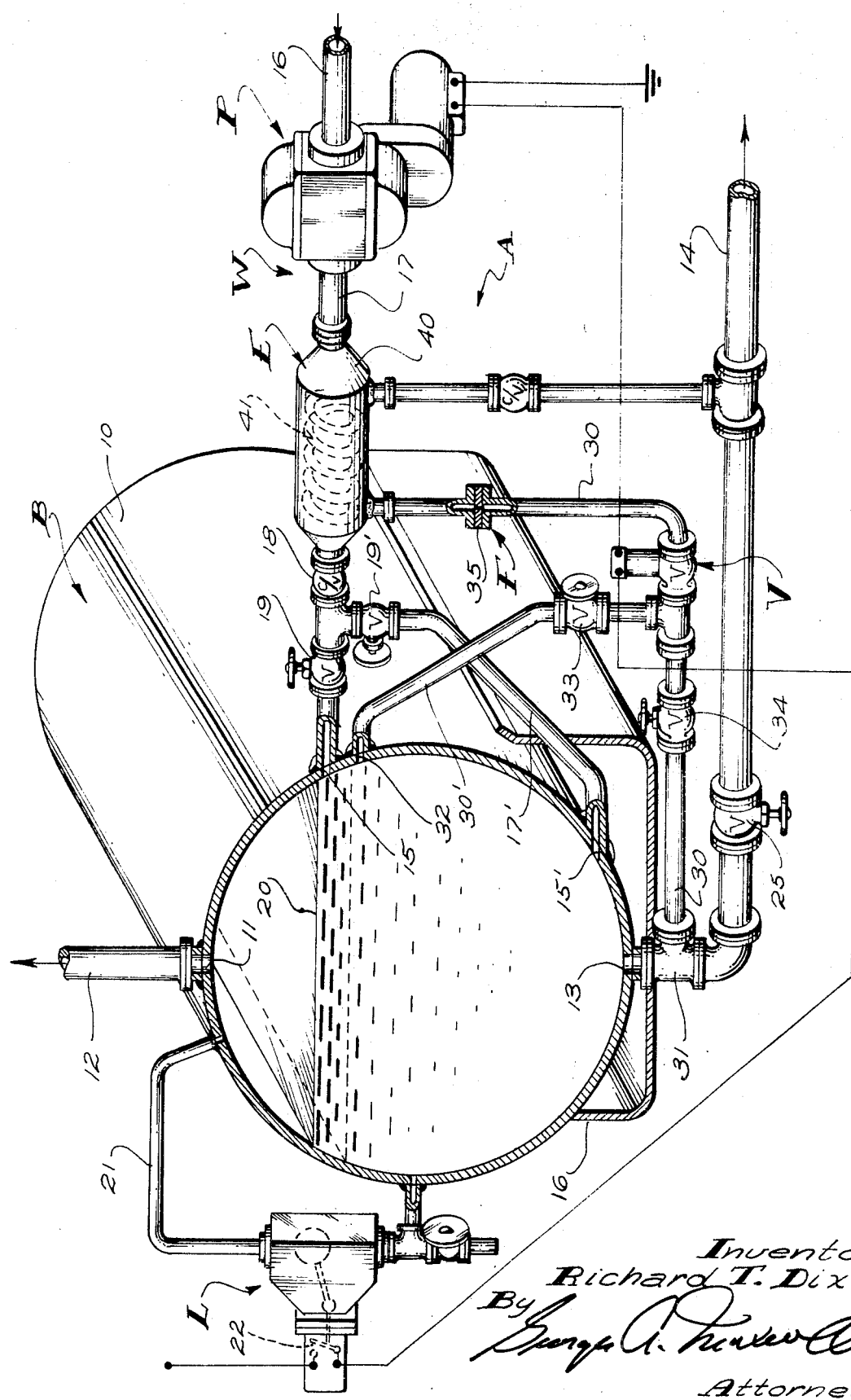
Inventor
Richard T. Dixon
By
George A. Purnell
Attorney

United States Patent Office 3,512,507
Patented May 19, 1970

3,512,507
METHOD AND APPARATUS TO CONTROL WATER SOLIDS IN BOILERS
Richard T. Dixon, Glendale, Calif. (% Dixon Boiler Works, 1625 Naud St., Los Angeles, Calif. 90012)
Filed Sept. 6, 1968, Ser. No. 758,091
Int. Cl. F22b 37/54
U.S. Cl. 122—382                      10 Claims

ABSTRACT OF THE DISCLOSURE

Means to prevent the accumulation of and to maintain a predetermined quantity of solids in the water in a boiler having an intermittently operated water feed or make-up apparatus, said means being designed to tap off a predetermined amount of water in the boiler when make-up water is injected therein, the volume of water tapped out being in predetermined ratio to the volume of water injected and containing substantially the same quantity of solids as is carried into the tank by the make-up water.

---

This invention has to do with a novel fresh water feed means for boilers and is more particularly concerned with such a means which effectively maintains the solids content of the boiler water at a predetermined quantity or volume.

In the course of operating a boiler, fresh water is intermittently introduced into the boiler to replace the water boiled off in the form of steam. The fresh water contains a quantity of volume of solids or foreign matter, which solids are not carried away by the steam, but remain and collect in the boiler. If the foreign matter is permitted to collect to an appreciable extent, considerable adverse effect and frequently impossible-to-repair damage is caused thereby.

In an effort to prevent the collecting and building up of an appreciable amount of foreign matter in boilers, it has long been the accepted practice in the art to periodically shut the boiler down and to drain, flush and refill the boiler with fresh water.

To lengthen the periods between draining and flushing boilers, for the purpose of purging them of collected foreign matter, it has become common practice to blow off a portion of the water at the bottom of the boiler, where or in which foreign matter has precipitated, and replace the water thus tapped off with fresh water. Such a practice is carried out by trial and error and in a rather hit and miss fashion.

This last, above-mentioned method of tapping the boiler water to remove some of the water heavily laden with foreign matter has been sophisticated further by chemically treating the boiler water so that the foreign matter remains in suspension. When boiler water is chemically treated to maintain foreign matter therein in suspension, in accordance with common chemical treatment methods and/or practice, the foreign matter, as a result of being in suspension and as a result of the boiling of the water, remains at or adjacent to the top or surface of the water and the water which is blown from the boiler to reduce the foreign matter content is, therefore, tapped from the top of the boiler water.

In spite of the above sophistication, controlling the amount of foreign matter in a boiler is still a hit and miss operation and cannot be depended upon for any protracted period of time.

The ordinary boiler is designed to operate with greatest efficiency at a predetermined level and under normal circumstances and conditions is operated at that level producing a predetermined volume of steam at a predetermined pressure and temperature and, as a result, using a predetermined volume of fresh water over any given period of operation of the boiler. Further, the volume or quantity of foreign matter in fresh water supplies is determinable and is substantially constant. In those situations where the solid content in the supply of fresh water is subject to change, the changes, as a general rule, occur periodically and are frequently determinable. Such changes frequently are seasonal in nature and can be anticipated and watched for.

Ordinarily, the maximum amount of solids that can be satisfactorily carried in boiler water is many times the amount of solids found in fresh water supplies. For example, boiler water can contain in the neighborhood of 3,400 parts per million of foreign matter and a supply of fresh water may contain about 170 parts per milion of foreign matter.

With the water input-steam output of a boiler known and established, and with maximum foreign matter or solids content of the boiler water determined and the solids content of the fresh water supply determined, it is the principal object and a feature of my invention to provide means to intermittently introduce fresh water into a boiler to replace boiled off water and to maintain a proper water level therein and to simultaneously tap off or extract boiler water in predetermined volumetric proportion to the inflowing fresh water and so that the volume of solids carried by the boiler water which is extracted is equal to the volume of solids carried by the fresh water introduced into the boiler and so the solids content of the boiler water is maintained substantially constant.

Referring to the above example wherein the maximum solids content of the boiler water is 3,400 parts per million and the solids content of the fresh water is 170 parts per million, it will be apparent that the ratio of twenty to one in solids content occurs between these waters. It will be further apparent that if one gallon of boiler water was tapped off for every twenty gallons of fresh water introduced into the boiler, the solid content of the boiler water would remain at 3,400 parts per million and that additional or new foreign matter introduced into the boiler by the fresh water would be compensated for by the foreign matter carried by and extracted from the boiler by the tapped off boiler water.

It is a further object and feature of this invention to provide a means for the purpose and of the character set forth above which is provided with heat exchanger means and is such that the heat of the extracted boiler water is transferred to the make up or fresh water effectively and efficiently and to the end that sufficient savings in the cost of operating the boiler is attained to defer the cost of the means that I provide in less than one year of operation of the boiler.

It is the object of my invention to provide a means of the general character referred to which is such that it can be easily and conveniently related to conventional boiler constructions having intermittent make up or water supply means without requiring material or adverse alteration or modification of the constructions.

A further object is to provide a means of the character referred to which is such that it requires the addition of a relatively few, simple, inexpensive and easy-to-install parts to existing, conventional boiler constructions of the character referred to and which is highly effective, durable and dependable in operation.

The foregoing objects and features of my invention will be fully understood from the following detailed description of typical preferred forms and applications of my invention, throughout which description reference is made to the accompanying diagrammatic drawings of a typical preferred form and application of my invention.

The means or apparatus A that I provide is adapted to be related to a conventional boiler construction B having a conventional intermittently operated water supply means W under control of a conventional water level sensing means L.

The boiler construction B, for the purpose of this disclosure is shown as a simple tank 10 with a steam outlet 11 at its top, suitably connected with a steam pipe 12, a blowdown opening 13 at its bottom suitably connected with a waste pipe 14, a filler opening 15 conneced with the supply means W and a fire box 16 at and about the bottom of the boiler tank.

In practice, the boiler construction can be of any of the well known boiler designs and constructions without departing from the spirit of this invention.

The water supply means W includes a motor driven pump P with its inlet connected with a water source 16, or the like, and with its outlet connected with a delivery line 17 suitably connected with the filler opening 15 of the boiler.

The delivery line 17 is shown provided with a heat exchanger E, a check valve 18 and a manually operable shut off valve 19.

The check valve 18 is shown arranged in the line 17 between the line 17 between the boiler and the heat exchanger E and serves to check the flow of water and/or steam back through the line 17, into and through the heat exchanger and pump when the pump is not in operation.

The shut-off valve 19 is arranged in the line 17 between the boiler tank and the check valve and is provided so that the means W can be shut down for servicing and the like.

In practice, the valves 18 and 19 and the heat exchanger E described above, considered separately or combined, can be elements, parts or components of prior or existing water supply means on existing boiler constructions with which my invention is to be related, or can be especially provided in accordance with this invention for water supply means in which these elements and/or parts are not otherwise provided.

In the case illustrated, the water inlet opening 15 is shown located in the side of the tank 10 at or in close proximity to the water level 20 in the tank. In practice, the opening 15 can be located in the bottom of the tank, if circumstances require, or, if desired, a secondary opening 15' can be provided in the tank 10, at the lower portion thereof, and connected with the means W by means of a line 17', under control of a valve 19', as illustrated in phantom lines in the drawings and so that make-up water can be selectively introduced into the tank at or adjacent the top or bottom of the body of water therein, as desired or as circumstances require.

If the boiler water is chemically treated so that solids are in suspension therein and tend to remain on the top of the water in the boiler, make-up water is best injected into the bottom of the tank, whereas, if the water is not so treated and the solids tend to drop to the bottom of the tank, make-up water is best injected into the top of the tank and so that immediate dilution of the boiler water, by the make-up water does not take place, and so that the effect sought to be gained by extracting boiler water in accordance with this invention is not adversely affected.

In accordance with the above, the advantages to be gained by the noted upper or lower placement of the opening 15 or the provision of upper and lower openings 15 and 15' will be readily seen and appreciated.

The water level control or sensing means L is a standard or conventional boiler component and is shown, diagrammatically, as a float activated switching means arranged in a flow line 21 extending between the side of the tank 10 at a point spaced below the water level 20 in the tank and the top of the tank.

The means L is provided with a switch 22 which controls operation of the pump P and so that when the water level 20 drops to a predetermined low point or line, the pump is energized and fills the tank to a predetermined high point or line.

The waste pipe 14 is, in accordance with common practice, provided wtih a manualy operable valve 25 to open and close the pipe as desired or as circumstances require.

The means A that I provide includes a tap line 30 with an electrically operated on and off valve V and a suitable flow regulator F arranged therein and connected with and between the tank 10 and the waste pipe 14, downstream of the valve 34 therein.

The line 30 can, if desired, extend to and/or connect with and suitably place a means for disposing of the water flowing therethrough, without departing from the spirit of this invention and is shown connected with the waste pipe 14 for the purpose of showing one preferred carrying out of the invention.

The end of the line 30 related to the tank 10 can connect with the tank to communicate with the interior thereof at or adjacent the bottom or the surface 20 of the water therein, as desired or as circumstances require. As pointed out above, and since it is the purpose of this invention to tap off water heavily laden with solids, if the water is chemically treated so that the solids are in suspension and occur at the top of the water in the boiler, water tapped from the boiler should be tapped from adjacent surface 20 thereof, whereas, if the water is not chemically treated and the solids tend to precipitate water tapped from the boiler should be tapped from the bottom thereof.

In practice, and so as to eliminate the necessity of providing a separate and special tap opening in the bottom of the tank to facilitate connecting the line 30 therewith and tapping water from the bottom thereof, I have shown the line 30 connected with a fitting 31 between the drain opening 13 and waste pipe 14.

Alternative or supplemental with the line 30 (with the valve V and means F therein) I have shown a line 30' extending between the line 30 at or adjacent the inlet side of the valve V to a tap opening 32 adjacent and below the surface 20 of the water. The line 30, upstream of its connection with line 30' and line 30' are provided with manually operable valves 33 and 34 to supplement the valve 19 for the purpose of putting the means W and A out of service, for repairs or the like, and for selectively tapping the water from the top or the bottom of the water in the boiler.

The flow control means F can be of any suitable design and construction and serves to control the volume of water flowing through the line 30.

The means F is shown as involving a flow bean or orifice plate 35 engaged between a pair of opposed flange fittings interposed in the line 30 and is such that it allows or permits a predetermined rate and volume of tapped water to flow through the line under the fixed predetermined operating pressure of the boiler construction.

For example, if the boiler pressure is 150 p.s.i., the rate of flow delivered by the pump P is 400 gallons per unit and a twenty to one ratio between make up and tapped water is desired, the means F or orifice plate of said means should be such as to permit the tapped water to flow at 20 gallons per unit.

In practice, if desired, the means F could be in the form of a metering valve, there being several standard commercially available metering valve constructions which would be particularly suitable for use in carrying out this invention.

In the preferred carrying out of my invention and as illustrated in the drawings, the flow line 30, downstream of the means F, has the heat exchanger E related to the means W interposed or engaged therein and so that the tapped water is conducted through the exchanger and a portion of the heat therein is utilized, by heat conduction or transfer, to heat the fresh, make-up water flowing through the line 17 and the heat exchanger E therein.

The heat exchanger can be of any suitable design and construction and is shown as including a cylindrical cannister-like body 40 engaged between sections of the line 17 and through which make-up water flows and as having a coiled tube 41 extending therethrough, the ends of which extend to the exterior of the body and connect with sections of the line 30.

The valve V is a simple, normally closed, commercially available, electrically operated on and off valve and is suitably electrically connected with the means L and/or pump P and is such that when the pump P is in operation, the valve is open and when the pump P is out of operation, the valve is in its normal closed position.

With the means A that I provide and as is described above, it will be apparent that each time the pump is put into operation and delivers fresh, make-up water to the boiler, the valve V opens and a predetermined relative and smaller volume of boiler water is tapped from the boiler and so that substantially the same amount or quantity of solids that are carried into the boiler by the make-up water is carried out of the boiler by the tapped off boiler water.

It will be apparent that the heat of the tapped off water is transferred to the make-up water thereby preventing a substantial and costly loss of heat energy throughout the operation of the invention.

Still further, it will be apparent that in accordance with the broader aspects of this invention, make-up water and tapped water can be injected into and dispelled from the boiler tank at any desired location, but in the preferred carrying out of the invention the make-up water should be injected into the boiler at a location remote from the place where the tapped water is withdrawn and so that water diluted by the make-up water is not tapped off.

Further, in the preferred carrying out of the invention, consideration is also given to whether or not the boiler water is chemically treated so that solids are in suspension and rise to the surface of the boiler water or non-chemically treated so that solids tend to precipitate or drop to the bottom of the boiler tank. If the water is treated as above indicated, provision is made to tap water from near the surface of the boiler water and to inject make-up water near the bottom of the tank, whereas, if the water is untreated, water is tapped from the bottom of the tank and injected at or near the top of the water therein.

Having described typical preferred forms of my invention and the manner in which they operate, I do not wish to be limited to the specific details herein set forth, but wish to reserve to myself any modifications and/or variations that may appear to those skilled in the art and which fall within the scope of the following claims.

Having described my invention, I claim:

1. In a boiler construction having a boiler tank with a body of boiler water therein, having a predetermined quantity of solid therein, make-up water supply means including a supply of make-up water having a predetermined quantity of solid therein, a motor driven pump to drive water from said supply, a delivery pipe from said pump to said tank and a fluid level sensing means related to the tank and having switch means to start and stop the pump, a tap line connected with the tank to tap boiler water therefrom, an electrically operated valve in the tap line and connected with the sensing means whereby said electrically operated valve is opened when the pump is operating and fluid metering means in said tap line to control the volume of flow therethrough in predetermined relationship to the volume of flow through the water supply means whereby the water tapped removes a quantity of solids from the tank substantially equal to the quantity of solid delivered into the tank by the water supply means.

2. A structure as set forth in claim 1 wherein the connection between the tank and tap line is remote from the tank and delivery pipe whereby boiler water tapped from the tank is not diluted by the water flowing into the tank.

3. A structure as set forth in claim 1 which further includes a heat exchanger connected with and between the tap line and delivery pipe whereby heat in the water in the tap line is transferred to the water in the delivery pipe.

4. A structure as set forth in claim 1 wherein the connection between the tank and tap line is remote from the tank and delivery pipe whereby boiler water tapped from the tank is not diluted by the water flowing into the tank, a heat exchanger connected with and between the tap line and delivery pipe whereby heat in the water in the tap line is transferred to the water in the delivery pipe.

5. A structure as set forth in claim 1 wherein said delivery pipe has a first branch with a valve therein connected with the tank adjacent the upper portion of the body of water therein and a second branch with a valve therein connected with the tank adjacent the lower portion of the body of water, whereby water can be selectively introduced into the upper or lower portions of the body of water, said tap line having a first branch with a valve therein connected with the tank adjacent the lower portion of the body of water and a second branch with a valve therein connected with the tank adjacent the upper portion of the body of water therein whereby the water can be selectively tapped from the upper and lower portions of the body of water.

6. A structure as set forth in claim 1 wherein said delivery pipe has a first branch with a valve therein connected with the tank adjacent the upper portion of the body of water therein and a second branch with a valve therein connected with the tank adjacent the lower portion of the body of water, whereby water can be selectively introduced into the upper or lower portions of the body of water, said tap line having a first branch with a valve therein connected with the tank adjacent the upper portion of the body of water therein whereby the water can be selectively tapped from the upper and lower portions of the body of water, a heat exchanger connected with and between the tap line and delivery pipe whereby heat in the water in the tap line is transferred to the water in the delivery pipe.

7. A structure as set forth in claim 1 wherein said delivery pipe has a first branch with a valve therein connected with the tank adjacent the upper portion of the body of water therein and a second branch with a valve therein connected with the tank adjacent the lower portion of the body of water, whereby water can be selectively introduced into the upper or lower portions of the body of water, said tap line having a first branch with a valve therein connected with the tank adjacent the upper portion of the body of water therein whereby the water can be selectively tapped from the upper and lower portions of the body of water, a connection between the tank and tap line being remote from the tank and delivery pipe whereby boiler water tapped from the tank is not diluted by the water flowing into the tank, said structure further including a heat exchanger connected with and between the tap line and delivery pipe whereby heat in the water in the tap line is transferred to the water in the delivery pipe.

8. A structure as set forth in claim 1 wherein said fluid metering means includes a pair of opposing flange fittings in the tap line and an orifice plate engaged between said fittings.

9. A structure as set forth in claim 1 wherein said delivery pipe has a first branch with a valve therein connected with the tank adjacent the upper portion of the body of water therein and a second branch with a valve therein connected with the tank adjacent the lower portion of the body water, whereby water can be selectively introduced into the upper or lower portions of the body of water, said tap line having a first branch with a valve therein connected with the tank adjacent the upper portion of the body of water therein whereby the water can be selectively tapped from the upper and lower portions of the body of water, a connection between the tank and tap line being remote from the tank and delivery pipe whereby boiler water tapped from the tank is not diluted by the water flowing into the tank, said structure further including a heat exchanger connected with and between the tap line and delivery pipe whereby heat in the water in the tap line is transferred to the water in the delivery pipe, said fluid metering means including a pair of opposing flange fittings in the tap line and an orifice plate releasably engaged between said fittings, said tank having a drain opening in its bottom, a waste pipe connected with said drain opening and having a shut-off valve therein, said tap line connected with the waste pipe downstream of said shut-off valve.

10. A structure as set forth in claim 1 wherein said delivery pipe has a first branch with a valve therein connected with the tank adjacent the upper portion of the body of water therein and a second branch with a valve therein connected with the tank adjacent the lower portion of the body of water, whereby water can be selectively introduced into the upper or lower portions of the body of water, said tap line having a first branch with a valve therein connected with the tank adjacent the upper portion of the body of water therein whereby the water can be selectively tapped from the upper and lower portions of the body of water, a connection between the tank and tap line being remote from the tank and delivery pipe whereby boiler water tapped from the tank is not diluted by the water flowing into the tank, said structure further including a heat exchanger connected with and between the tap line and delivery pipe whereby heat in the water in the tap line is transferred to the water in the delivery pipe, said fluid metering means including a pair of opposing flange fittings in the tap line and an orifice plate releasably engaged between said fittings, said tank having a drain opening in its bottom, a waste pipe connected with said drain opening and having a shut-off valve therein, said tap line connected with the waste pipe downstream of said shut-off valve, said delivery pipe having a check valve therein upstream of the first and second branches and downstream of said heat exchanger.

References Cited
UNITED STATES PATENTS

| | | | |
|---|---|---|---|
| 1,904,900 | 4/1933 | Kreigsheim | 122—382 XR |
| 1,913,195 | 6/1933 | Donaldson et al. | 122—382 |

KENNETH W. SPRAGUE, Primary Examiner